(12) United States Patent
Behr et al.

(10) Patent No.: US 6,818,085 B2
(45) Date of Patent: Nov. 16, 2004

(54) FIBER-REINFORCED STRUCTURAL COMPONENT

(75) Inventors: Thomas Behr, Elchingen (DE); Manfred Kurbjuhn, Blaustein (DE); Robert Michal, Schemmerhofen/Albe (DE); Michael Niestegge, Ulm (DE); Karl-Ludwig Weisskopf, Rudersberg (DE)

(73) Assignee: DaimlerChrysler AG, Stuttgart (DE)

( * ) Notice: Subject to any disclaimer, the term of this patent is extended or adjusted under 35 U.S.C. 154(b) by 9 days.

(21) Appl. No.: 10/148,448

(22) PCT Filed: Mar. 2, 2001

(86) PCT No.: PCT/EP01/02359
§ 371 (c)(1),
(2), (4) Date: May 30, 2002

(87) PCT Pub. No.: WO01/72661
PCT Pub. Date: Oct. 4, 2001

(65) Prior Publication Data
US 2002/0179225 A1 Dec. 5, 2002

(30) Foreign Application Priority Data
Mar. 24, 2000 (DE) ........................................ 100 14 418

(51) Int. Cl.⁷ ........................ C04B 35/573; C04B 35/80
(52) U.S. Cl. .................. 156/89.26; 264/29.2; 264/29.6; 264/640; 264/682
(58) Field of Search ...................... 156/89.26; 264/29.1, 264/29.2, 29.6, 640, 641, 682, 658

(56) References Cited

U.S. PATENT DOCUMENTS

| | | | | |
|---|---|---|---|---|
| 4,267,211 A | * | 5/1981 | Yajima et al. | 427/228 |
| 5,079,195 A | * | 1/1992 | Chiang et al. | 501/92 |
| 5,102,698 A | * | 4/1992 | Cavalier et al. | 427/376.1 |
| 5,230,946 A | * | 7/1993 | Fisher | 428/212 |

(List continued on next page.)

FOREIGN PATENT DOCUMENTS

| | | | |
|---|---|---|---|
| DE | 39 33 715 | * | 4/1990 |
| DE | 44 38 455 | | 5/1996 |
| DE | 44 38 456 | | 5/1996 |
| DE | 196 51 798 | | 6/1998 |
| DE | 197 11 829 | * | 9/1998 |
| DE | 197 27 586 | * | 2/1999 |

(List continued on next page.)

OTHER PUBLICATIONS

Letter of Objection, dated Oct. 2, 2003, R. Damerow, W. Hauf, 9 pages.
Opposition to the German patent DE 100 14 418 C2 (translation of German document filed with Supplemental Information Disclosure Statement filed Jan. 5, 2004).

Primary Examiner—Melvin C. Mayes
(74) Attorney, Agent, or Firm—Crowell & Moring LLP

(57) ABSTRACT

A process for producing a fiber-reinforced, ceramic structural component comprising high-temperature resistant fibers which are reaction-bonded to a matrix of silicon carbide comprises the steps of coating bundles of fibers with pyrolysable binder and solidifying the binder, producing mixtures of fiber bundles, fillers and binders, pressing the mixtures to produce a pressed body, pyrolysing the pressed body under the exclusion of oxygen to form a porous, carbon-containing preform, infiltrating the preform with a silicon melt to form the silicon carbide matrix, in which various pressing compounds are produced, which contain fibers of different quality and in different proportions and different coatings. These pressing compounds are arranged at different levels and in different spatial directions in the press mould during the filling of the press mould. After the pressing, the regions produced in this way are retained in the press mould. After the infiltration of the preform with silicon, the structural component is distinguished by different materials properties, in particular ductility and resistance to wear.

10 Claims, 4 Drawing Sheets

U.S. PATENT DOCUMENTS

| | | | |
|---|---|---|---|
| 5,242,746 A | | 9/1993 | Bommier et al. |
| 5,354,398 A | * | 10/1994 | Kawai ..................... 156/89.26 |
| 5,441,762 A | * | 8/1995 | Gray et al. ................. 427/190 |
| 5,677,060 A | * | 10/1997 | Terentieva et al. .......... 428/408 |
| 5,725,955 A | * | 3/1998 | Tawil et al. ................ 428/408 |
| 5,853,821 A | * | 12/1998 | Balhadere et al. .......... 427/601 |
| 6,042,935 A | | 3/2000 | Krenkel et al. .......... 428/307.7 |
| 6,079,525 A | * | 6/2000 | Dietrich et al. ......... 188/251 A |
| 6,086,814 A | | 7/2000 | Krenkel et al. ............. 264/610 |
| 6,254,975 B1 | * | 7/2001 | Kayser et al. ............ 428/293.4 |
| 6,261,981 B1 | * | 7/2001 | Dietrich et al. ............ 501/95.2 |
| 6,358,565 B1 | | 3/2002 | Krenkel et al. ............. 427/343 |
| 6,576,076 B1 | * | 6/2003 | Tani ........................ 156/89.26 |
| 2002/0028294 A1 | | 3/2002 | Krenkel et al. ............. 427/343 |
| 2003/0138672 A1 | * | 7/2003 | Bauer et al. ................ 428/698 |

FOREIGN PATENT DOCUMENTS

| | | | |
|---|---|---|---|
| DE | 197 46 598 | | 4/1999 |
| DE | 198 05 868 | * | 10/1999 |
| DE | 198 34 018 | | 2/2000 |
| DE | 198 34 704 | | 2/2000 |
| EP | 0 528 131 | * | 2/1993 |
| WO | 99/41069 | * | 8/1999 |

* cited by examiner

FIBER-REINFORCED STRUCTURAL COMPONENT

This application claims the priority of Application No. 100 14 418.7, filed Mar. 24, 2000, in Germany, the disclosure of which is expressly incorporated by reference herein.

FIELD OF THE INVENTION

The invention relates to a process for producing a structural component.

BACKGROUND OF THE INVENTION

A process of the generic type is known, for example, from DE 197 11 829 C1. The process for producing a fiber-reinforced structural component which is known from this document comprises the steps of pressing a mixture of coated carbon fiber bundles, fillers and binder to produce a pressed body, pyrolysing this pressed body to form a carbon-containing preform, and infiltrating this preform with liquid silicon to form a fiber-reinforced matrix of silicon carbide (SiC matrix), which, depending on the process conditions used, may contain silicon residues. Structural components produced using this process have a ductility which is high for ceramic materials and a high resistance to wear and can be used at temperatures of up 1400° C. However, if structural components of this type are exposed to such temperatures for a prolonged period under oxidizing conditions, the carbon fibers at the surface may be oxidized. When the surface is mechanically stressed, this may lead to the surface fibers becoming detached, leading to a rougher surface and a reduction in wear resistance.

DE 198 05 868 A1 describes a process in which pressing compounds containing fibers of different qualities are pressed in a plurality of laminar layers. After the infiltration with the silicon, the component obtained in this way, which is in the form of a brake disc, has a ductile middle layer and two more brittle but more oxidation-resistant outer layers. However, the highest mechanical load on the brake disc acts on the inner region of the ring which, for process reasons, is likewise formed by relatively ductile and brittle layers.

SUMMARY OF THE INVENTION

Accordingly, the invention is based on the object of improving the process described above in such a way that the oxidation of the carbon fibers at the surface is minimized and, at the same time, the ductility of the structural component is substantially retained.

The solution consists of a process having the features of the presently claimed invention.

The inventive process according to the present invention is distinguished by the fact that specific, different mixtures of fiber bundles, generally carbon fibers, fillers and binders are used to produce a pressed body. The mixtures substantially differ from one another with regard to the quality of the bundles of fibers, their length, the quantity of individual fibers therein and their coatings. One mixture contains relatively long fibers with a protective layer (mixture A), which largely prevents reaction between the silicon and the carbon fiber. As a result, the reinforcing effect of the fibers is optimally utilized in the component, leading to a ductile behavior of this component region (ductile regions). A further mixture contains, in addition to fillers and binders, fibers which are less well protected against the liquid, infiltrating silicon (mixture B). During the infiltration, these fibers are largely converted by the silicon to form a homogeneous, dense and oxidation-resistant but relatively brittle SiC layer (brittle regions). The separate position of the mixtures in the radial and axial directions in a press mold therefore allows the materials properties of the resulting component to be adapted to the mechanical and frictional demand imposed on the component.

During the filling of a press mold with the mixtures A and B, separating features are arranged in a press mold, preventing the mixtures A and B and/or further mixtures from mingling with one another. The separating feature may be designed in the form of metal sheets or foils. The sheets or foils are shaped in such a way that the mixtures A and B can be arranged separately from one another in all spatial directions. After the filling, the separating features are removed, and the mixtures are pressed to form the pressed body. The separate regions of the mixtures A and B are retained in the pressed body.

To make surface regions of the structural component particularly resistant to wear, the mixtures are arranged in such a way in the press mold that the mixture B lies at the frictionally loaded friction surfaces of the component.

To increase the ductility of the mechanically loaded component regions, mixture A is arranged in such a way in the press mold that it is distributed in the core of the component and in the inner ring, since this is where particularly ductile materials properties are required.

The material produced by the process is a gradient material. This means that there is no exact contact layer between the component regions. This is attributable to the mingling of the pressing compounds at their boundary surfaces during the pressing. The gradual transitions between the regions are particularly advantageous for avoiding delamination or desired breaking points.

The proportion of SiC in mixture B used at the surface regions is higher than in the regions in the core and in the inner ring (mixture A), where the fibers are in the form of carbon. On account of the different material compositions and their different expansion coefficients, thermal stresses may be generated. To reduce possible thermal stresses, it is expedient to form grooves in the brittle regions of the surface, which grooves are of approximately the same depth as the brittle regions.

A further solution consists in an inventive process according to the present invention. In this process, the finished structural component, which is produced almost completely from a mixture A, is impregnated, at the frictionally loaded surfaces, with a medium which forms an oxidation-resistant layer during further treatment. This medium is a liquid medium which is capable of impregnation and contains a base material for the oxidation-resistant layer and a solvent. A low wetting angle with respect to the surface of the structural component and a low viscosity are advantageous for the impregnability of the medium. The advantage of this process consists in the fact that the entire component can be formed by ductile regions, and the fiber bundles at the surface are additionally protected against oxidation at high temperatures.

Polymers which produce compounds comprising silicon, oxygen and carbon during a heat treatment at below 200° C. are suitable as base material for the oxidation-resistant layer. The impregnation may take place a number of times, in order to achieve optimum results.

Furthermore, SiC-containing adhesives which are dissolved in a solvent and the viscosity of which, which influences the impregnation behavior, can be adjusted by means of the solvent content are suitable for impregnation. In this case, multiple impregnation is once again particularly advantageous.

The materials for impregnation of the surface generally impregnate spontaneously through the action of the capillary forces. To accelerate the impregnation process, it is expedient for this process to be assisted by the use of an elastic bar which is drawn over the surface. In this way, the pressure on the surface is locally increased. The use of a squeegee, as is also used in screen printing, is particularly suitable for this purpose.

A further inventive solution according to the present invention is the production of a layer which substantially comprises silicon carbide (SiC layer) on the component surface. For this purpose, during the production of the structural component, a layer of pyrolysable material (pyrolysable layer) is at least partially applied to the pressed body or to the porous preform or to the structural component, preferably to the porous preform. The term pyrolysable material is understood as meaning an organic material, such as for example pitches or phenolic resins, which can be reduced to form carbon. Furthermore, in its starting form the pyrolysable material may contain carbon in all modifications and forms (e.g. in fiber or powder form), as well inorganic fillers, such as for example SiC. The pyrolysis of the pyrolysable layer takes place either during a process-related heat treatment (pyrolysis of the pressed body or infiltration of the preform), or an additional process step is introduced for this purpose. After the infiltration with silicon, the regions of the pyrolysable layer have been converted into an SiC layer, which protects the carbon fibers below from oxidation at high temperatures and, moreover, is particularly wear-resistant. The SiC layer is securely joined to the component surface. Furthermore, the SiC layer may have a pattern of fine hairline cracks, which is advantageous for reducing possible stresses in the SiC layer.

To reduce materials costs, the pyrolysable layer may, in addition to the above-mentioned constituents, contain milling residues, which are produced during the machining of the preform, and/or SiC. Depending on requirements and availability, this mixing may take place in different combinations. The pyrolysis may take place during the pyrolysis of the pressed body to form the preform if process features, such as for example the condition of the pyrolysis furnace or of the furnace for infiltration require this to be the case. However, it is particularly preferable for the pyrolysable layer to be applied to preform and to be pyrolysed during the heating for infiltration with the silicon, since this results in the smallest reaction-related change in volume in the layer.

In a further embodiment, the pyrolysed layer comprises caramelized sugar, which is likewise preferably pyrolysable during the heating for silicon infiltration and is infiltrated with silicon in the same process step. After the infiltration, the result is a dense SiC layer which protects the fiber bundles below from oxidation. This variant of the SiC layer is particularly expedient on account of the low raw materials costs.

All the SiC layers described have a thickness of from 0.2 to 5 mm. In practice, is has been found that a layer thickness of between 0.5 mm and 2.5 mm is particularly favorable with regard to the protection against oxidation and requires the lowest outlay on process engineering.

All the processes which have been described to date are particularly expedient if the component is a brake disc which is already in use, for example, in automotive engineering and in railway vehicle engineering.

In this application, particularly high temperatures occur at frictional faces of the surface, which is precisely where a particularly high resistance to wear is required.

On the other hand, a particularly high ductility of the supporting material is required in the core layer of the disc and, in particular, in the inner region of the ring. Particularly for a brake disc, the invention offers an excellent combination of particularly wear-resistant and particularly ductile regions while guaranteeing all other properties which are required for this component.

Other objects, advantages and novel features of the present invention will become apparent from the following detailed description of the invention when considered in conjunction with the accompanying drawings.

BRIEF DESCRIPTION OF THE DRAWING FIGURES

Exemplary embodiments of the present invention are explained in more detail below with reference to the appended drawings, in which.

DETAILED DESCRIPTION OF THE PREFERRED EMBODIMENT

EXAMPLE 1

Carbon fiber bundles of a type A are provided with a coating of phenolic resin. The carbon fiber bundles have a length of 16 mm and a bundle thickness of 3000 individual fibers. The coated fiber bundles of type A are mixed with graphite powder and phenolic resin dissolved in furfuryl alcohol in a ratio of 1:1 for approximately one hour in a star rotor mixer (mixture A). A further mixture comprising uncoated carbon fiber bundles of a type B with a length of 3 mm is mixed with the same additives as in mixture A, likewise for one hour in a start rotor mixture (mixture B).

Figure 1:
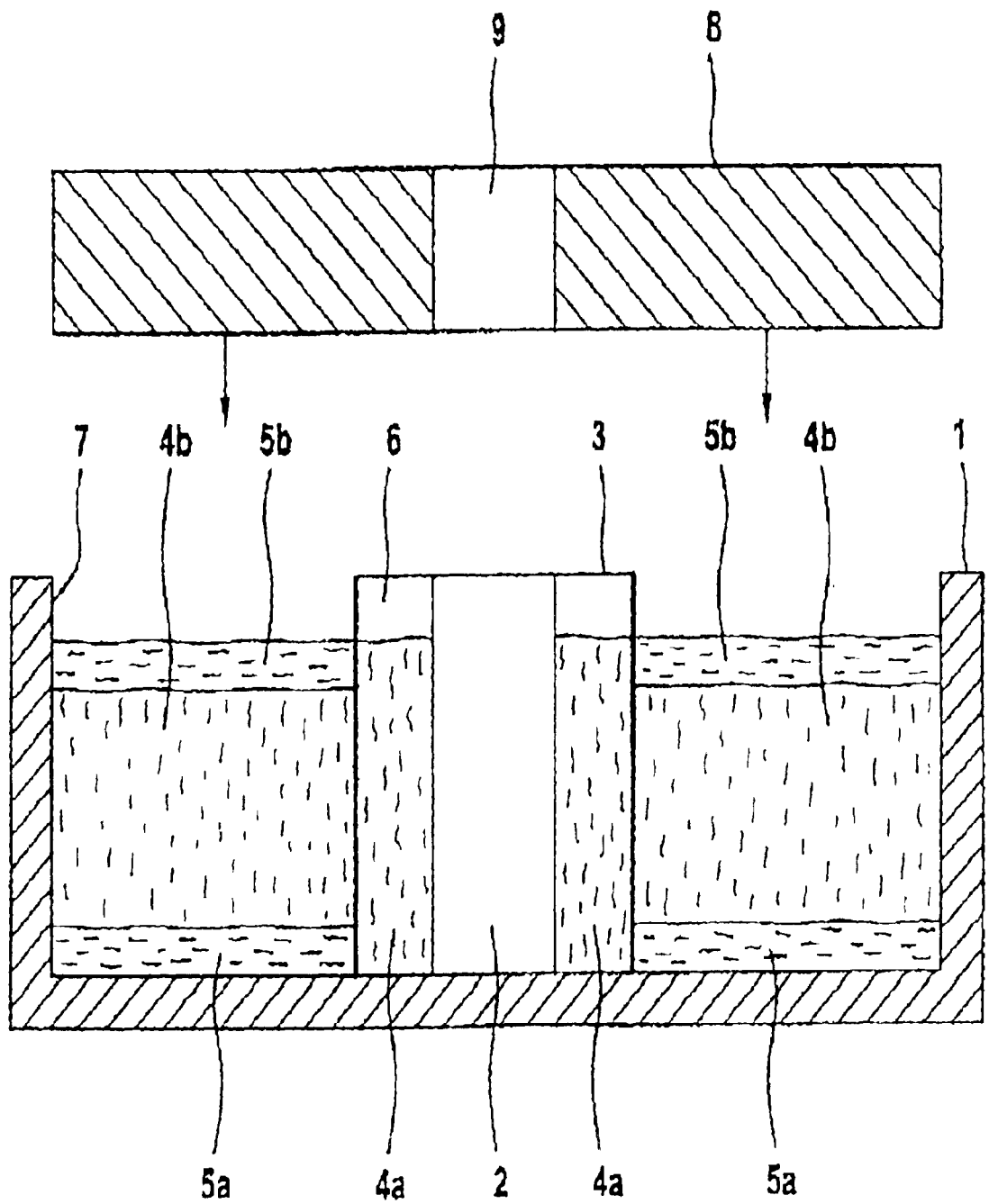
FIG. 1 shows a cross section through a press die during the filling with pressing compounds.

As shown in FIG. 1, in a cylindrical press mold 1 with a cylindrical inner mandrel 2, a metal sheet 3 which has been shaped into a cylinder is placed concentrically around the inner mandrel 2. The mixture A 4a is introduced into the cylindrical cavity 6, which is formed by the inner mandrel 2 and the metal sheet 3, to the desired filling level. The mixture B 5a is introduced up to a height of 10 mm between an outer boundary 7 of the press mold 1 and the cylindrical metal sheet 3. Then, the mixture A 4b is introduced on top of this, to a height of 50 mm, and this is in turn followed by mixture B 5b (10 mm). The metal sheet 3 is removed, and the mixtures which have been arranged in this way are pressed by a press ram 8, which has a cutout for the inner mandrel 9 at a temperature of 100° C., during which process the phenolic resin of the mixtures A 4a, 4b and B 5a, 5b is cross linked. The pressing causes the mixtures A 4a, 4b and B 5a, 5b which are in contact with one another to be locally mixed slightly at the boundary surfaces. A pressed body obtained in this way is then pyrolysed at 1000° C. under argon to form a preform, during which process all the organic constituents are reduced to form carbon.

The annular preform is heated in a furnace, in a bed comprising silicon granules, with the exclusion of oxygen, to 1600° C., during which process the silicon granules melt and the preform is infiltrated with liquid silicon by the action of the capillary forces. During the infiltration, the carbon of the preform is converted by the silicon to form an SiC matrix. The fibers of the mixture A, which are protected by a layer of carbon, are not converted in this process, so that these fibers have a reinforcing effect on the surrounding SiC matrix (ductile region 11).

Figure 2:
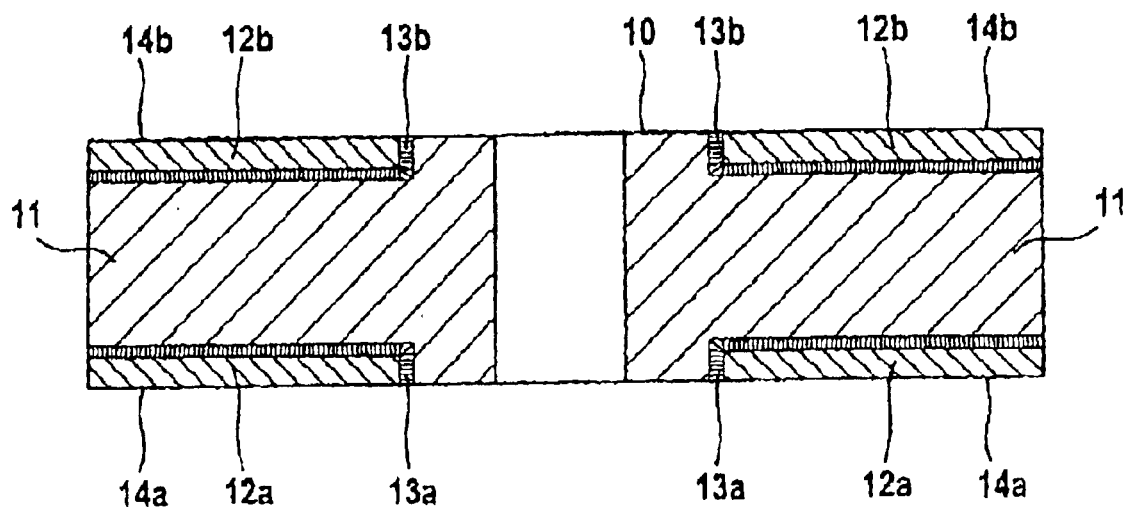
FIG. 2 shows a sectional illustration of a break disc friction ring, in which the materials regions produced are illustrated.

The fibers of mixture B are almost completely converted into SiC, and together with the SiC matrix, form a dense SiC region (oxidation-resistant region 12a, 12b). The result is a brake disc friction ring, referred to below as friction ring 10, as shown in FIG. 2.

The friction ring 10 comprises ductile regions 11 in the inner concentric ring and in the inner layer of the ring, which can be traced back to the mixture A 4a, 4b. At the frictional surfaces 14a, 14b, the friction ring 10 comprises oxidation-resistant regions 12a, 12b which originate from the mixture B 5a, 5b. On account of the local mixed layer in the pressed body, there is not a sharp delineation between the ductile regions and the oxidation-resistant regions, but rather a transition 13a, 13b in gradient form.

EXAMPLE 2

Figure 3:
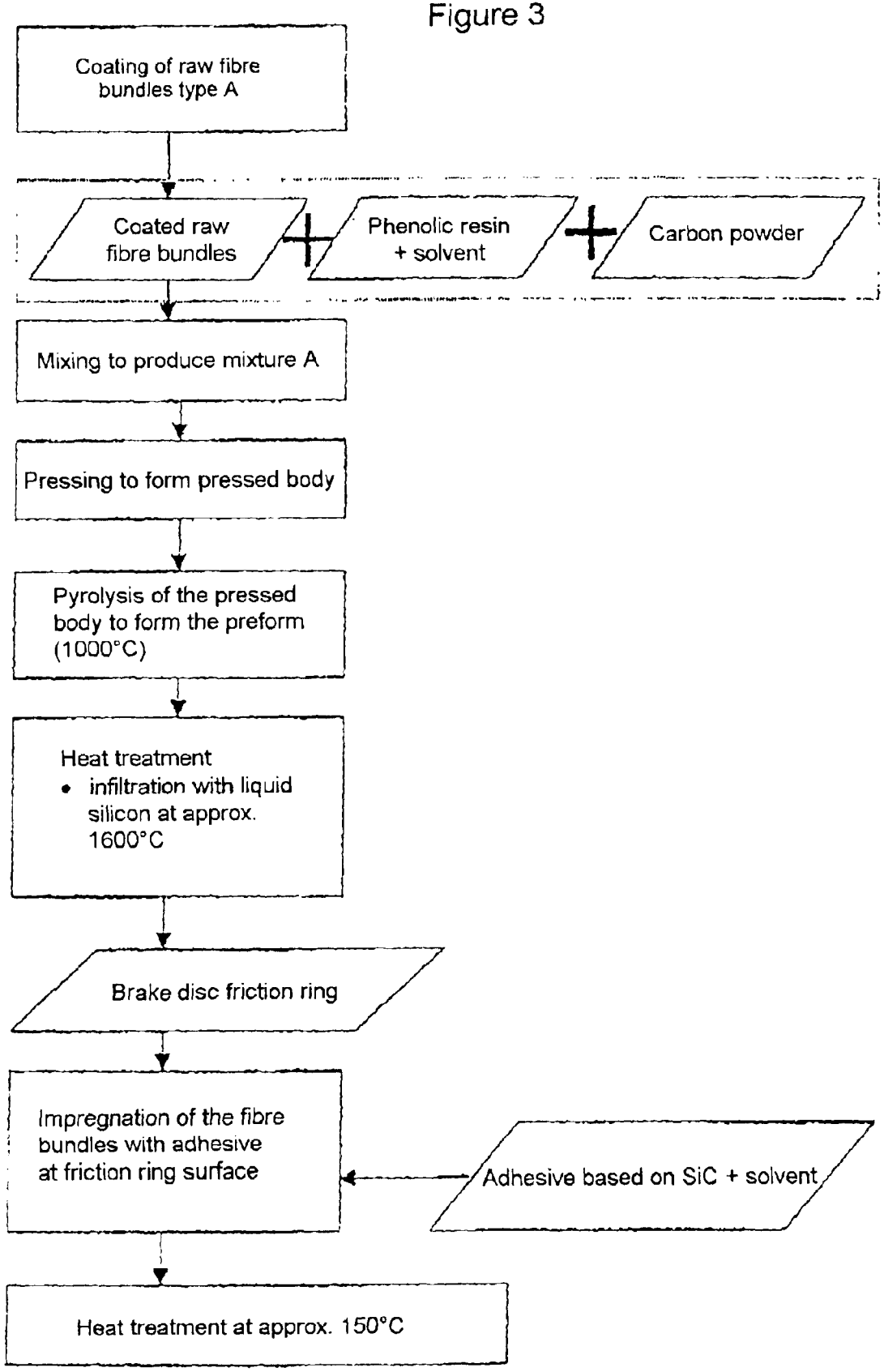
FIG. 3 shows a process flowchart corresponding to Example 2.

As shown in FIG. 3, the press mold 1 illustrated in FIG. 1 is filled with the mixture A without the use of the cylindrically shaped metal sheet 3 and is pressed and crosslinked in a similar manner to that described with reference to Example 1. The further process for the production of a friction ring likewise takes place in a similar manner to Example 1. The friction ring obtained in this way consists exclusively of the base material of the mixture A and is not identical to the friction ring 10 shown in FIG. 2. At the surfaces, as well as the SiC matrix it has carbon fiber bundles. An SiC-based adhesive dissolved in a solvent is applied to the surface of the friction ring. A squeegee is used to impregnate the capillaries of the carbon fiber bundles with this solution. A heat treatment is carried out at approx. 150° C., during which the solvent is evaporated and the binder forms an SiC protective layer in the fiber bundles. This impregnation is repeated one or two times in order to achieve optimum coating.

EXAMPLE 3

The friction ring is produced in a similar manner to Example 2, except that the impregnation is carried out using a polymer which, on undergoing a heat treatment at 100° C., forms a protective layer on the fibers, comprising a compound of silicon, carbon and oxygen. The impregnation is repeated twice, with the result that optimum protection of the fibers is produced.

EXAMPLE 4

Figure 4:
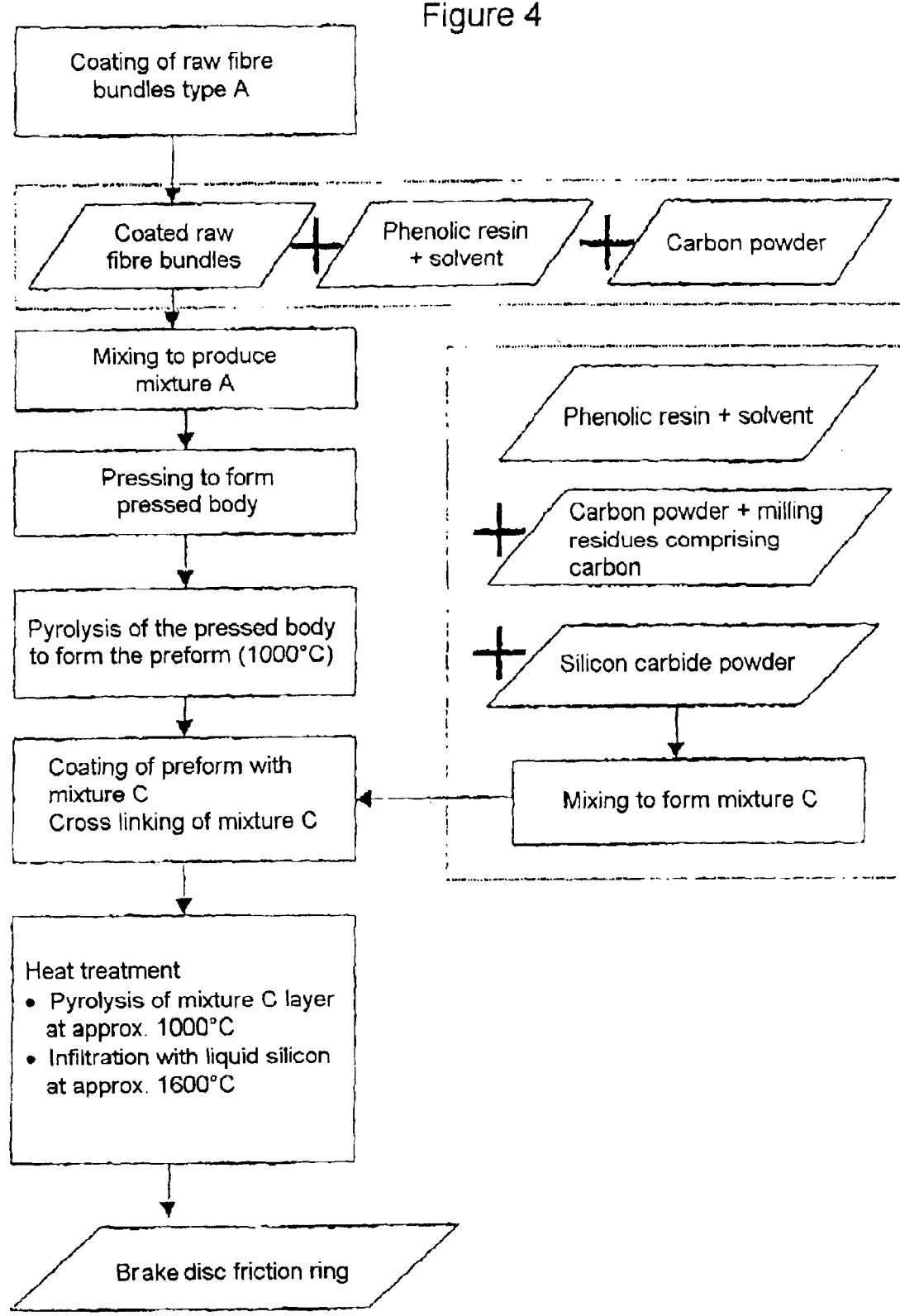
FIG. 4 shows a process flowchart corresponding to Example 4.

As shown in FIG. 4, the process for producing the preform is carried out in a similar manner to Example 2. A mixture which comprises a carbon fiber powder, milling residues formed during the machining of the preform and a phenolic resin dissolved in furfuryl alcohol (mixture C) is applied to the surface of the pyrolysed preform. The preform with the layer of mixture C is clamped between two metal plates and subjected to a heat treatment at approximately 130° C., during which the phenolic resin is cross linked. The preform coated in this way is heated in a furnace, under the exclusion of oxygen, in a bed of silicon granules. The pyrolysis of mixture C takes place at a temperature of 100° C. during a holding time of 3 hours. There then follows a further heating to a temperature of 1600° C., during which the silicon granules are melted and infiltrate the preform and the pyrolysed layer of the mixture C through capillary forces. In the process, the reaction between the Si and the carbon takes place to form the SiC matrix, without the carbon fibers being converted. The pyrolysed layer of mixture C is converted into an SiC layer which protects the fibers lying beneath this layer from oxidation.

EXAMPLE 5

The preform is produced in a similar manner to that described in Example 4, but instead of the mixture C, a layer of caramelized sugar and carbon is applied to the preform. The pyrolysis and infiltration likewise takes place in a similar manner to that described in Example 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for producing a fiber-reinforced, ceramic structural component comprising high-temperature resistant fibers based on carbon, which are reaction-bonded to a matrix of silicon carbide (SiC), comprising the steps of:

coating bundles of fibers with pyrolysable binder and solidifying the binder;

producing a mixture of said coated fiber bundles, fillers and binders;

pressing the mixture in a press mold to produce a pressed body;

pyrolysing the pressed body in the absence of oxygen to form a porous, carbon-containing preform; and infiltrating the preform with a silicon melt to form a silicon carbide matrix;

wherein various mixtures are produced, which contain fibers of at least one of different quality or different amounts, with or without coatings;

wherein during filling of the press mold, the press mold is provided with separating means and the mixtures are arranged in regions which extend in different spatial directions in the press mold;

wherein the regions produced in this way are retained in the preform after the pressing and crosslinking; and wherein as a result of the infiltration of the preform with silicon, component regions of high ductility and component regions of high resistance to oxidation are present in the structural component.

2. A process according to claim 1, wherein particularly wear-resistant component regions are produced at the surface of the structural component.

3. A process according to claim 1, wherein ductile component regions are produced in mechanically loaded zones of the structural component.

4. A process according to claim 1, wherein the transitions between the component regions are gradual.

5. A process according to claim 1, wherein at least one surface of the structural component is provided with grooves.

6. A process for producing a fiber-reinforced, ceramic structural component comprising high-temperature resistant fibers based on carbon, which are reaction-bonded to a matrix of silicon carbide, comprising the steps of:

coating bundles of fibers with pyrolysable binder and solidifying the binder;

producing a mixture of said coated fiber bundles, fillers and binders;

pressing the mixture to produce a pressed body;

pyrolysing the pressed body in the absence of oxygen to form a porous, carbon-containing preform; and infiltrating the porous preform with a silicon melt to form the silicon carbide matrix;

wherein the surface of the structural component is impregnated with a liquid which penetrates into the fiber bundles at the surface and is converted into an oxidation-resistant protective layer, said structural component being impregnated by means of a polymer which, after a heat treatment, forms a compound comprising Si, O and C.

7. A process for producing a fiber-reinforced, ceramic structural component comprising high-temperature resistant fibers based on carbon, which are reaction-bonded to a matrix of silicon carbide, comprising the steps of:

coating bundles of fibers with pyrolysable binder and solidifying the binder;

producing a mixture of said coated fiber bundles, fillers and binders;

pressing the mixture to produce a pressed body;

pyrolysing the pressed body in the absence of oxygen to form a porous, carbon-containing preform; and infiltrating the porous preform with a silicon melt to form the silicon carbide matrix;

wherein the surface of the structural component is impregnated with a liquid which penetrates into the fiber bundles at the surface and is converted into an oxidation-resistant protective layer wherein the liquid is applied to the surface of the structural component and is pressed into the surface with the aid of an elastic bar to assist the capillary action.

8. A process for producing a fiber-reinforced, ceramic structural component comprising high-temperature resistant fibers based on carbon, which are reaction-bonded to a matrix of silicon carbide, comprising the steps of:

coating bundles of fibers with pyrolysable binder and solidifying the binder;

producing a mixture of said coated fiber bundles, fillers and binders;

pressing the mixture to produce a pressed body;

pyrolysing the pressed body in the absence of oxygen to form a porous, carbon-containing preform; and infiltrating the porous preform with a silicon melt to form the silicon carbide matrix;

wherein the surface of the structural component is impregnated with a liquid which penetrates into the fiber bundles at the surface and is converted into an oxidation-resistant protective layer wherein the impregnation takes place by means of an SiC-containing adhesive which, after a heat treatment, forms an SiC layer and wherein the SiC layer has a thickness of between 0.2 mm and 5 mm.

9. A process for producing a fiber-reinforced, ceramic structural component comprising high-temperature resistant fibers based on carbon, which are reaction-bonded to a matrix of silicon carbide, comprising the steps of:

coating bundles of fibers with pyrolysable binder and solidifying the binder;

producing a mixture of said coated fiber bundles, fillers and binders;

pressing the mixture to produce a pressed body;

pyrolysing the pressed body in the absence of oxygen to form a porous, carbon-containing preform; and infiltrating the porous preform with a silicon melt to form a silicon carbide matrix;

wherein a layer of pyrolysable material is applied to the porous preform or the structural component and is pyrolysed to form a porous carbon-containing layer;

wherein the pyrolysable layer comprises a mixture of a pyrolysable organic material and at least one of a carbon, milling residue from the machining of the preform, and a SiC powder, and is being pyrolysed during the pyrolysis, or during the heating for silicon infiltration, or after the infiltration with liquid silicon; and wherein the pyrolysable layer is then converted, by infiltration with liquid silicon, into a layer which substantially comprises silicon carbide.

10. A process according to claim 9, wherein the SiC layer has a thickness of between 0.5 mm and 2.5 mm.

* * * * *